US012625690B2

(12) United States Patent
Sohn et al.

(10) Patent No.: US 12,625,690 B2
(45) Date of Patent: May 12, 2026

(54) ELECTRONIC DEVICE AND METHOD FOR CHANGING BINARY

(71) Applicant: SAMSUNG ELECTRONICS CO., LTD., Suwon-si (KR)

(72) Inventors: Dongjin Sohn, Suwon-si (KR); Eunseob Ko, Suwon-si (KR); Soomin Kim, Suwon-si (KR); Youngjoo Kim, Suwon-si (KR); Jaesung Park, Suwon-si (KR); Jeongho Lee, Suwon-si (KR); Moonyoung Jung, Suwon-si (KR); Areum Jeong, Suwon-si (KR); Sungho Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/199,103

(22) Filed: May 18, 2023

(65) Prior Publication Data
US 2023/0289157 A1      Sep. 14, 2023

Related U.S. Application Data

(63) Continuation of application No. PCT/KR2021/015510, filed on Nov. 1, 2021.

(30) Foreign Application Priority Data

Jan. 13, 2021    (KR) ........................ 10-2021-0004405

(51) Int. Cl.
*G06F 8/52*          (2018.01)
*G06F 8/65*          (2018.01)
(52) U.S. Cl.
CPC . *G06F 8/52* (2013.01); *G06F 8/65* (2013.01)

(58) Field of Classification Search
None
See application file for complete search history.

(56) References Cited

U.S. PATENT DOCUMENTS 8,996,002 B2     3/2015  Rodgers et al.
9,312,901 B2     4/2016  Park et al.
(Continued)

FOREIGN PATENT DOCUMENTS

KR     10-2004-0041288 A     5/2004
KR     10-2005-0119035 A     12/2005
(Continued)

OTHER PUBLICATIONS

Communication dated Feb. 11, 2022, issued by the International Searching Authority in counterpart International Application No. PCT/KR2021/015510 (PCT/ISA/210).
(Continued)

*Primary Examiner* — Lewis A Bullock, Jr.
*Assistant Examiner* — Mark A Gooray
(74) *Attorney, Agent, or Firm* — Sughrue Mion, PLLC

(57) ABSTRACT

A system server includes a communication module for communicating with an electronic device and an external server, a memory that stores device information and production information for a plurality of electronic devices received from the external server, and a processor operatively connected to the communication module and the memory where the processor is configured to receive unique state information from the electronic device based on the electronic device accessing the system server, compare the received unique state information with the device information for the plurality of electronic devices stored in the memory to determine whether a binary change is required in the electronic device, generate change information including
(Continued)

information about a binary to be changed, and transmit the generated change information to the electronic device.

6 Claims, 14 Drawing Sheets

(56)                    References Cited

U.S. PATENT DOCUMENTS

| | | | | |
|---|---|---|---|---|
| 9,838,250 | B1 * | 12/2017 | Ali | H04L 67/125 |
| 10,044,215 | B2 | 8/2018 | Choi et al. | |
| 10,560,816 | B2 | 2/2020 | Sohn et al. | |
| 11,368,360 | B2 | 6/2022 | Song et al. | |
| 2007/0143247 | A1 * | 6/2007 | Brunswig | G06F 16/25 |
| 2009/0064038 | A1 | 3/2009 | Fleischman et al. | |
| 2014/0380340 | A1 * | 12/2014 | Knichel | G06F 8/654 |
| | | | | 719/327 |
| 2015/0019856 | A1 | 1/2015 | Kim et al. | |
| 2016/0088026 | A1 * | 3/2016 | Mohamad Abdul | G06F 8/65 |
| | | | | 726/1 |
| 2016/0112213 | A1 | 4/2016 | Lee et al. | |
| 2020/0213403 | A1 | 7/2020 | Yang | |
| 2021/0020306 | A1 * | 1/2021 | Hulan | G06F 8/65 |

FOREIGN PATENT DOCUMENTS

| | | | |
|---|---|---|---|
| KR | 10-2015-0008546 | A | 1/2015 |
| KR | 10-2015-0121899 | A | 10/2015 |
| KR | 10-2016-0030661 | A | 3/2016 |
| KR | 10-1656241 | B1 | 9/2016 |
| KR | 10-2017-0049897 | A | 5/2017 |
| KR | 10-1923937 | B1 | 11/2018 |
| KR | 10-2018-0131258 | A | 12/2018 |
| KR | 10-2000234 | B1 | 7/2019 |
| KR | 10-2020-0021545 | A | 2/2020 |

OTHER PUBLICATIONS

Communication dated Feb. 11, 2022, issued by the International Searching Authority in counterpart International Application No. PCT/KR2021/015510 (PCT/ISA/237).

Communication issued Sep. 21, 2025 by the Korean Intellectual Property Office in Korean Patent Application No. 10-2021-0004405.

* cited by examiner

| Device                ∧ | Service Resale Request- Change Resale Code |
| Test Resale Request     | |
| Service Resale Request  | Please upload file according to the sample [ ⬇ ] |
| Resale Request History  | |
|                         | ☁ Drop files to attach, or browses. |

ELECTRONIC DEVICE AND METHOD FOR CHANGING BINARY

CROSS-REFERENCE TO RELATED APPLICATION

This application is a bypass continuation application of International Application No. PCT/KR2021/015510, filed on Nov. 1, 2021, which is based on and claims priority to Korean Patent Application No. 10-2021-0004405, filed on Jan. 13, 2021, in the Korean Intellectual Property Office, the disclosures of which are incorporated by reference herein in their entireties.

BACKGROUND

1. Field

Various embodiments of the disclosure generally relate to an electronic device, and more particularly, to an electronic device capable of initializing a previously applied binary in the electronic device and easily changing to another binary or a self-sufficient terminal.

2. Description of Related Art

With the development of mobile communication and hardware and/or software technology, a portable electronic device such as a smartphone (hereinafter, referred to as an electronic device) may be equipped with various functions. The electronic device may store various software in a memory, and a software binary (or system software) such as a bootloader, an operating system, or a device driver may be recorded or flashed in a predetermined area of the memory.

The software binary may be initially recorded in the memory of the electronic device during the process of the electronic device, after which a user may update the software binary by using an update tool in another device connected to the electronic device. In order to use the electronic device after the initial recording or update of such system software, a rebooting process may be required.

Conventional electronic devices are directly collected and reworked by manufacturers, and resold to users in order to change binaries to other binaries or self-sufficiency system after recording the binaries.

When a used terminal is delivered to a designated operator, there are problems that the binary is fixed with the software of the corresponding operator, resulting in poor usability as a used terminal, and the work cost is added when the manufacturer reworks the used terminal.

Various embodiments of the disclosure are intended to provide a more efficient change method in terms of time and cost when the electronic device attempts to record the software binary in the memory and then change the software binary, as described above.

SUMMARY

According to an aspect of the disclosure, a system server includes a communication module for communicating with an electronic device and an external server, a memory storing device information and production information on a plurality of electronic devices received from the external server, and a processor operatively connected to the communication module and the memory, and the processor is configured to: receive unique state information from the electronic device based on the electronic device accessing the system server, compare the received unique state information with the device information on the plurality of electronic devices stored in the memory to determine whether a binary change is required in the electronic device, generate change information comprising information on a binary to be changed, and transmit the generated change information to the electronic device.

The processor may be further configured to: communicate with the external server by using the communication module, and receive the device information and the production information based on a user input or a terminal database.

The system server may further include a first validity logic identifying at least one of whether the electronic device is a normally produced terminal, whether a model of the electronic device is a supported model, whether an ID of the electronic device is valid, and whether there is no error in input data based on the received device information and the received production information.

The processor may be further configured to map the device information according to specified criteria to generate a key table, and store the key table in the memory.

The processor may be further configured to: determine whether the electronic device is a valid electronic device through an authentication process based on the electronic device accessing the system server, and receive the unique state information based on the electronic device being determined as the valid electronic device, and the system server may further include a second validity logic verifying at least one of whether the electronic device is actually produced electronic device, whether an ID of the electronic device is a normal unique ID, and whether the electronic device is a normal electronic device, based on the unique state information.

The change information generated by the processor may include information on a second binary to be changed based on a change to a first binary applied to the electronic device being required, and the change information generated by the processor may not include information on the second binary based on a change to a binary not being required.

According to an aspect of the disclosure, an electronic device includes a communication module for communicating with a system server, a memory storing unique state information comprising at least one of a unique ID, a model number, and binary information of a terminal, user data, and a plurality of binaries, and a processor operatively connected to the communication module and the memory, and the processor is configured to: access the system server, transmit the unique state information to the system server, receive change information on a first binary applied to the electronic device from the system server, and change binary information based on the received change information.

The processor may be further configured to: delete the user data of the electronic device, and access the system server automatically at first booting after the user data is deleted.

The processor may be further configured to, based on the received change information: change the first binary to a second binary based a specified second binary existing in the change information, and initialize the binary information based on the specified secondary binary not existing in the change information.

The processor may be further configured to: identify whether the change information received from the system server is applied, and determine whether to change the binary information based on a user input.

The processor may be further configured to update a value in a reference value storage module based on the received change information and change the binary information based on the updated value in the reference value storage module.

According to an aspect of the disclosure, a binary change method of an electronic device includes accessing a system server by the electronic device, transmitting unique state information to the system server, receiving change information on a first binary applied to the electronic device, and changing binary information based on the received change information. The accessing of the system server may include deleting user data of the electronic device, and accessing the system server automatically at first booting after the user data is deleted.

The changing of the binary information based on the received change information may include changing the first binary to a second binary based on a specified second binary existing in the change information, and initializing the binary information based the specified second binary not existing in the change information.

The changing of the binary information may include identifying whether the change information received from the system server is applied, and determining whether to change the binary information based on a user input.

The method may further include storing, by the system server, device information in the system server based on a user input or a terminal database, comparing, by the system server, unique state information and device information of the electronic device to determine whether a binary change is required for the electronic device, generating, by the system server, change information comprising information on a binary to be changed, and transmitting, by the system server, the generated change information to the electronic device.

The changing of the binary information may include updating a value in a reference value storage module based on the received change information and changing the binary information based on the updated value in the reference value storage module.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a user input screen of a system server according to various embodiments;

FIG. 6 is a configuration diagram of an electronic device and a system server according to various embodiments;

DETAILED DESCRIPTION

Figure 1:
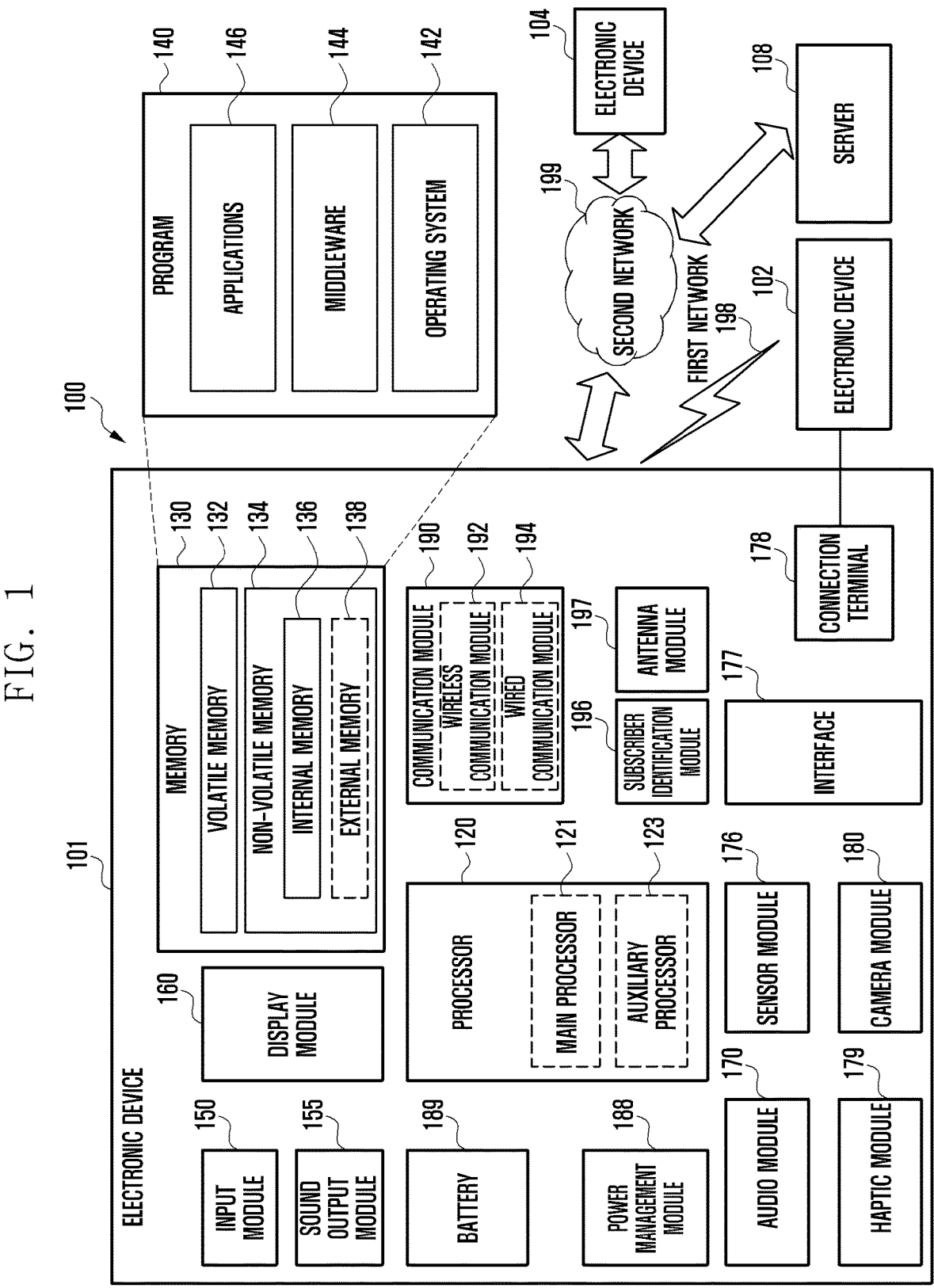
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
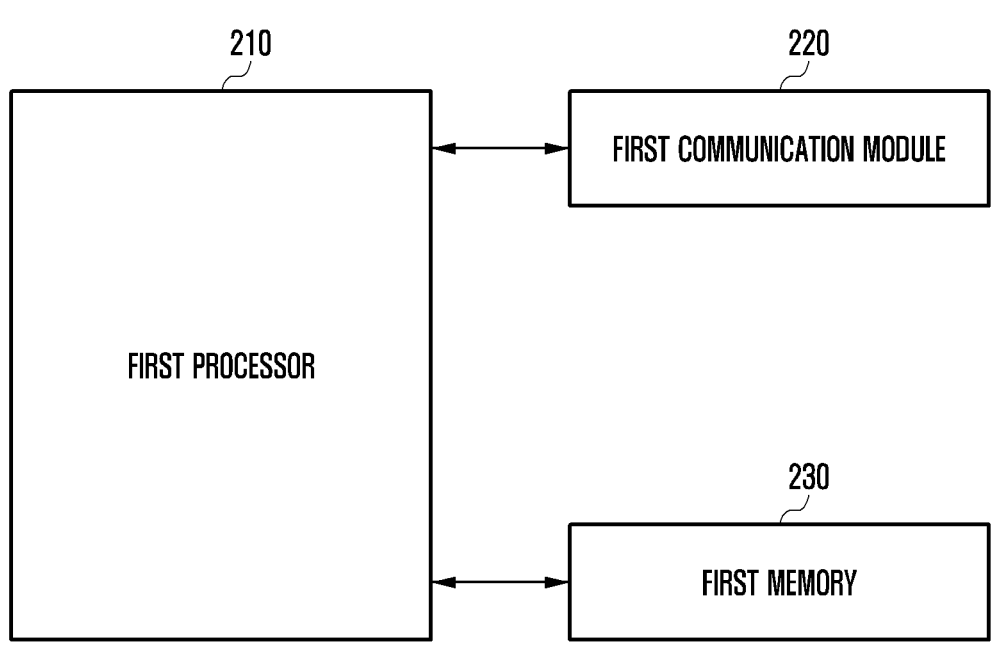
FIG. 2 is a block diagram of a system server according to various embodiments.

FIG. 2 is a block diagram of a system server according to various embodiments.

Referring to FIG. 2, the system server 200 (e.g., the server 108 of FIG. 1) may include a first communication module 220, a first processor 210, and/or a first memory 230, and some of the components illustrated in various embodiments may be omitted or replaced. At least some of the components of the illustrated (or not illustrated) system server 200 may be operatively, functionally and/or electrically interconnected. The system server 200 may be composed of a plurality of server devices connected to each other on a network, and each function may be distributed and processed on different server devices.

According to various embodiments, the first communication module 220 may communicate with an external device (e.g., the electronic device 101 of FIG. 1 or the electronic device 300 of FIG. 3) through a network under the control of the first processor 210.

According to various embodiments, the first memory 230 may temporarily or permanently store various data including a volatile memory and a non-volatile memory.

According to various embodiments, the first memory 230 may store various instructions that may be executed by the first processor 210. These instructions may include control commands such as arithmetic and logic operations, data movement, or input/output that may be recognized by the first processor 210.

According to various embodiments, the first processor 210 may be operatively, functionally, and/or electrically connected to each component such as the first communication module 220 and the first memory 230 of the system server 200 and may perform calculations or data processing related to control and/or communication of each component.

According to various embodiments, the calculation and data processing functions that the first processor 210 may implement on the system server 200 will not be limited, but hereinafter, various embodiments for changing the binary of the electronic device without rework in conjunction with the electronic device and an external server will be described. Operations of the first processor 210 to be described later may be performed by loading instructions stored in the first memory 230.

According to various embodiments, the first processor 210 may communicate with an external server by using the first communication module 220 to receive device information and/or production information. The device information may include a unique ID, a model number, or a current specification of the electronic device. The current specification may include configuration values that may meet the requirements of operators and countries, necessary applications, or resources (e.g., country-specific languages, operator wallpapers, ringtones, etc.). The production information may include information on at least one of a manufacturing location and timing of the corresponding electronic device (e.g., in which factory and when the electronic device was produced), or suitability of the manufacturing factory. For example, the first processor 210 may obtain information that the electronic device was produced at the first factory on Jan. 1, 2020 by referring to the production information.

According to various embodiments, the system server 200 receiving the device information and the production information may store the received device information and the received production information in a storage (not illustrated). According to an embodiment, a user may connect to the system server 200 and directly input the data, or may input the data into a terminal database and then link the terminal database with the system server 200 to transmit data. The user may also transmit the data by using both methods. For example, the user may directly input data by accessing an administrator server existing in the system server 200 to transmit the data, or input necessary data into the terminal database and indirectly transmit the data by connecting the terminal database and the system server 200. The data input through the administrator server and/or the terminal database may be stored in a storage (not illustrated). When information is input by using the terminal database, the first processor 210 may receive the input information through an application programming interface (API) and store the same in the first memory 230. Various methods commonly used in the industry may be used for the security method between the terminal database and the first processor 210, and various embodiments of the disclosure do not deal with specific security methods.

According to various embodiments, when receiving device information and production information from an external server, the first processor 210 may execute at least one process for verifying validity of the device information and the production information. For example, the first processor 210 may execute a first validity logic for verifying the validity.

According to various embodiments, the first validity logic may include an operation for identifying at least one of whether the electronic device connected to the system server 200 is a normally produced electronic device, whether the model is supported by the system server 200, whether the unique ID of the electronic device is valid, or whether there is an error in the input data by utilizing the received device information and the production information.

According to various embodiments, when a designated electronic device passes the first validity logic, the first processor 210 may designate a criterion for generating a key table by mapping information on the electronic device to each unique ID. The designated criterion may include at least one of a model number, a unique ID, current specifications, and production information of the electronic device, and also include various other information on the corresponding electronic device. The first processor 210 may generate the key table including device information according to the specified criterion. When the system server 200 communicates with the electronic device, the key table may be used to determine whether there is a specification to be changed by comparing the unique state information of the accessed electronic device. For example, the key table may be generated by mapping and storing a first model number, a first current specification, and first production information of a first electronic device having a first unique ID, and mapping a second model number, a second current specification, and second production information of a second electronic device having a second unique ID. When the first electronic device accesses the system server 200 later, the first processor 210 may obtain the first model number, the first current specification, and first production information of the first electronic device by searching the first electronic device in the key table.

According to various embodiments, the first processor 210 may communicate with an electronic device by using the first communication module 220. After a process of deleting existing user data stored in the electronic device (e.g., factory data reset) is performed, the electronic device may be configured to access the system server 200 upon the first booting. The system server 200 may determine whether the connected electronic device is a valid electronic device through an authentication process for the connected electronic device. For example, when the electronic device is a product manufactured by a third party, access of the corresponding electronic device to the system server 200 may be blocked during the authentication process.

According to various embodiments, when it is determined that the connected electronic device is valid, the first processor 210 may receive unique state information including at least one of a model number, a unique ID, and current specifications transmitted by the electronic device.

According to various embodiments, the first processor 210 may identify whether the electronic device is normal by verifying the received unique state information through a second validity logic. The second validity logic may determine at least one of whether the electronic device is actually produced and whether the unique ID is normal based on the currently loaded software version information and the received production information. For example, when the received unique state information records that the electronic device was produced at the second factory on Nov. 1, 2020, but the data of the production information does not contain an electronic device produced at the second factory on Nov. 1, 2020, the first processor 210 may determine the corresponding electronic device as an abnormal electronic device.

According to various embodiments, the first processor 210 may identify whether information on the connected electronic device exists in the first memory 230 when it is confirmed that the connected electronic device is normal. That is, the first processor 210 may inquire the key table in the first memory 230 to determine whether information corresponding to the received unique ID of the electronic device exists. When information corresponding to the unique ID of the electronic device does not exist, the corresponding electronic device may not need to be changed. For example, when the unique ID of the electronic device accessing the system server 200 is 1234567, an electronic device having a unique ID of 1234567 may be searched in the key table. As a result of the search, the first processor 210 may identify whether there is a change if the electronic device having the unique ID of 1234567 exists, and terminate the communication connection with the electronic device if the electronic device having the unique ID of 1234567 does not exist.

According to various embodiments, the first processor 210 may generate change information including items to be changed in the electronic device and transmit the information to the electronic device. When the binary of the electronic device needs to be changed, the change information may include information on the binary to be changed. When the binary of the electronic device does not need to be changed, the change information may not include binary information. For example, when the electronic device does not require a binary change as a result of identifying the key table by the first processor 210, the binary information may not be included when generating the change information. Conversely, as a result of identifying the key table, when the electronic device requires the binary change, change information including binary information indicating the binary to be changed may be generated.

Figure 3:
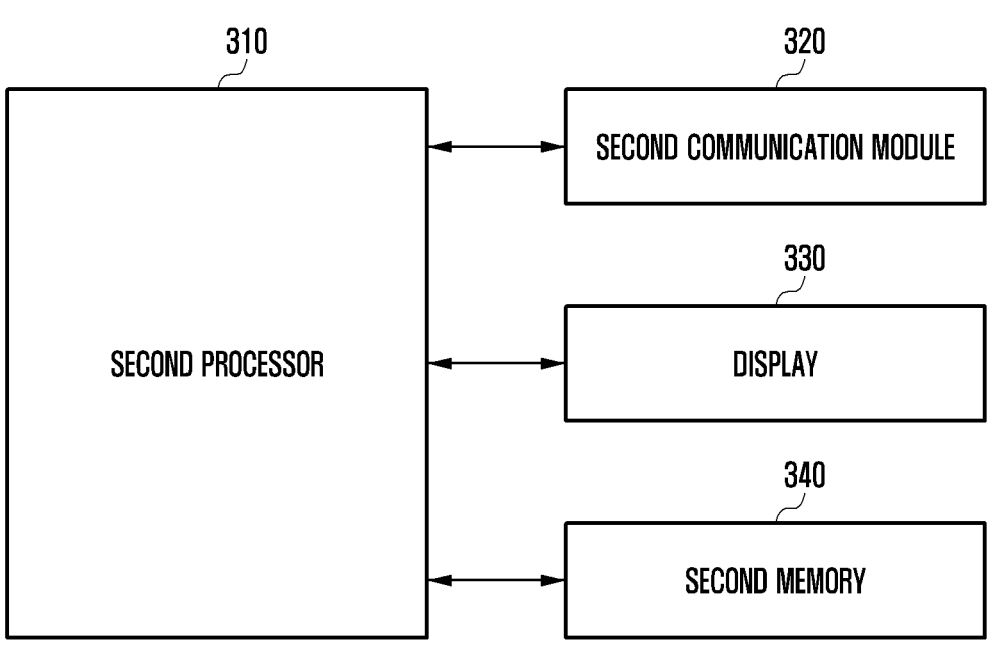
FIG. 3 is a block diagram of an electronic device according to various embodiments.

FIG. 3 is a block diagram of an electronic device according to various embodiments.

Referring to FIG. 3, the electronic device 300 may include a display 330, a second communication module 320, a second processor 310, and/or a second memory 340, and some of the components illustrated in various embodiments may be omitted or replaced. The electronic device 300 may further include at least some of the configurations and/or functions of the electronic device 101 of FIG. 1. At least some of the components of the illustrated (or not illustrated) electronic device 300 may be operatively, functionally, and/or electrically connected to each other.

According to various embodiments, the display 330 may display various images according to the control of the second processor 310. The display 330 may be implemented with any one of a liquid crystal display (LCD), a light-emitting diode (LED) display, and an organic light-emitting diode (OLED) display, but is not limited thereto. The display 330 may be configured as a touch screen that detects a touch and/or a proximity touch (or hovering) input using a user's body part (e.g., a finger) or an input device (e.g., a stylus pen). The display 330 may include at least some of the components and/or functions of the display module 160 of FIG. 1.

According to various embodiments, at least a portion of the display 330 may be flexible, and may be implemented as a foldable display, a rollable display, or a combination thereof.

According to various embodiments, the second communication module 320 may communicate with an external device (e.g., the electronic devices 102 and 104 or the server 108 of FIG. 1, or the system server 200 of FIG. 2) through a wireless network under the control of the second processor 310. The second communication module 320 may include hardware and/or software modules for transmitting and receiving data from cellular networks (e.g., long term evolution (LTE) networks, 5G networks, new radio (NR) networks), and local networks (e.g., Wi-Fi, Bluetooth). The second communication module 320 may include at least some of the components and/or functions of the communication module 190 of FIG. 1.

According to various embodiments, the second memory 340 may temporarily or permanently store various data including a volatile memory (e.g., the volatile memory 132 of FIG. 1) and a non-volatile memory (e.g., the non-volatile memory 134 of FIG. 1). The second memory 340 may include at least a part of the configuration and/or functions of the memory 130 of FIG. 1 and may store the program 140 of FIG. 1.

According to various embodiments, the second memory 340 may store various instructions that may be executed by the second processor 310. These instructions may include control commands such as arithmetic and logic operations, data movement, or input/output that may be recognized by the second processor 310.

According to various embodiments, the second processor 310 may be operatively, functionally, and/or electrically connected to each component such as the display 330, the second communication module 320, and/or the second memory 340 of the electronic device 300 and the first processor 210 of the system server 200, and may perform calculations or data processing related to control and/or communication of each component. The second processor 310 may include at least some of the components and/or functions of the processor 120 of FIG. 1.

According to various embodiments, the calculation and data processing functions that the second processor 310 may implement on the electronic device 300 will not be limited, but hereinafter, various embodiments for changing the binary of the electronic device 300 without rework in conjunction with the system server 200 will be described. Operations of the second processor 310 to be described later may be performed by loading instructions stored in the second memory 340.

According to various embodiments, the second processor 310 may store production information and unique state information of the electronic device 300, and existing user data in the second memory 340. The unique state information may be part of initialization information configured to the electronic device 300 at the factory, or may be information configured or updated by a user while using the electronic device 300. The binary may be preloaded in the electronic device 300 and/or downloaded through the system server 200, and include at least one of configuration values, applications, and resources capable of meeting the requirements of the operators and the countries. For example, the electronic device to be used in a network of a designated operator may store software binaries including applications or configurations suitable for the operator. According to an embodiment, the user may update the binary while using the electronic device 300, and when the electronic device 300 is self-sufficient, the binary may be configured as a binary of the desired communication operator.

According to various embodiments, the second processor 310 may delete existing user data stored in the second memory 340. For example, when reworking a used terminal collected from a user or company of the electronic device 300 to recycle the terminal, the stored user data may be deleted. According to an embodiment, the second processor 310 may be configured to automatically connect to the system server 200 upon the first booting after deleting existing user data. According to another embodiment, even though the booting is not the first time, if the electronic device 300 does not receive change information from the system server 200 after deleting the existing user data, the second processor 310 may be configured to access the system server 200 again upon booting.

According to various embodiments, the second processor 310 may undergo an authentication process for determining whether the electronic device 300 is valid after accessing the system server 200. The authentication process may include an operation of identifying whether the corresponding electronic device 300 has authority to access the system server 200 or whether the electronic device is not an unauthorized product. For example, when an unauthorized electronic device 300 tries to access the system server 200, access of the corresponding electronic device 300 may be blocked during the authentication process.

According to various embodiments, after accessing the system server 200 and undergoing the authentication process, the second processor 310 may transmit production information and unique state information stored in the second memory 340 to the system server 200. The second processor 310 may transmit production information and unique state information to the system server 200 through an application programming interface. The specific operation of the components responsible for the communication connection between the system server 200 and the second processor 310 will be described in detail with reference to FIG. 6.

According to various embodiments, the second processor 310 may undergo a second validity logic for verifying the transmitted information. In the second validity logic, it is possible to determine, based on the unique state information, at least one of whether the electronic device 300 having accessed the system server 200 is the actually produced electronic device 300, whether the electronic device has a normal unique ID, or whether the electronic device is a normal electronic device 300. When it is determined that the electronic device 300 that has accessed the system server 200 is not a normal electronic device 300 in the second validity logic, access of the electronic device 300 may be blocked. For example, when the information on the electronic device 300 inquired from the key table in the first memory 230 is different from the unique state information, the system server 200 may determine the information as an erroneous access and block the access.

According to various embodiments, the second processor 310 may receive change information from the system server 200. The change information may or may not include binary information. In the case of including the binary information, the second processor 310 may change the first binary currently applied to the electronic device 300 to the second binary. A specific operation of receiving the change information and changing the binary by the second processor 310 will be described in detail with reference to FIG. 6.

According to various embodiments, the second processor 310 may identify whether to apply the corresponding change when information on the binary exists in the received change information. The second processor 310 may not apply the corresponding change even if the change information received from the system server 200 includes information on the binary to be changed.

Figure 4:
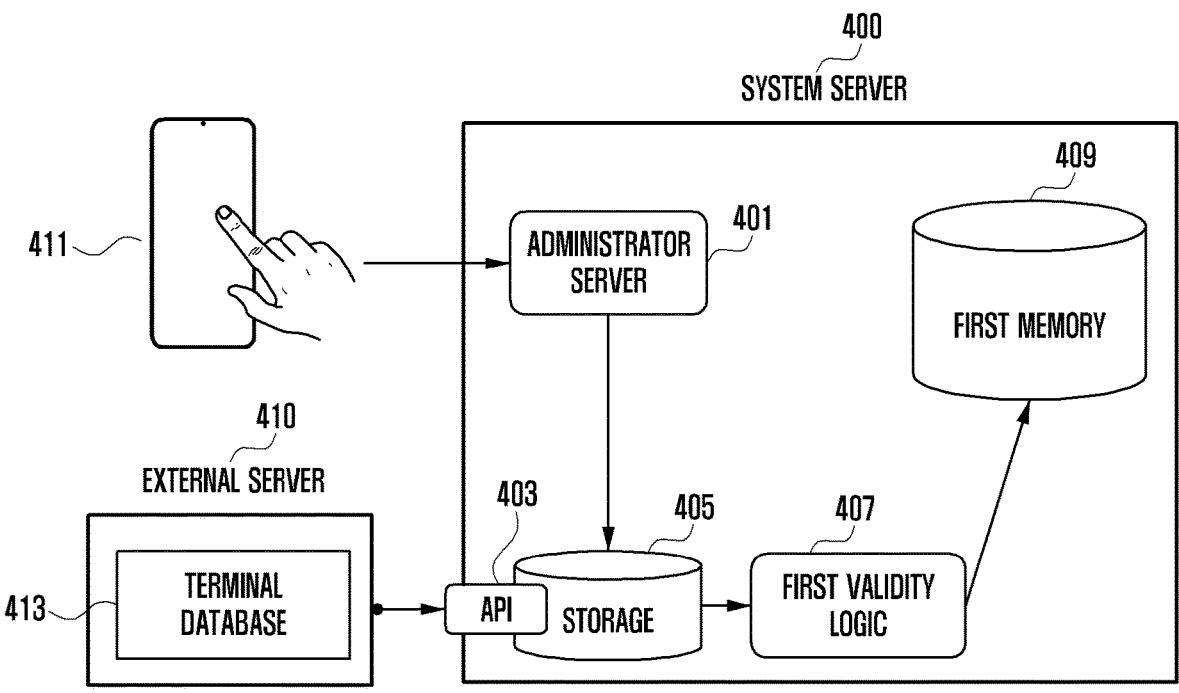
FIG. 4 is a configuration diagram of an external server and a system server according to various embodiments.

FIG. 4 is a configuration diagram of an external server and a system server according to various embodiments.

Referring to FIG. 4, the external server 410 may transmit device information to the system server 400 (e.g., the system server 200 of FIG. 2). According to an embodiment, a user 411 having accessed the external server 410 may directly enter data into an administrator server 401 in the system server 400. Inputs may be entered for each unique ID, or multiple IDs may be entered simultaneously by using predefined formats. For example, information on used terminals collected by used phone dealers may be directly entered into the administrator server 401. According to another embodiment, data may be entered into a terminal database 413 in the external server 410 without entering data into the system server 400 directly. Data input into the terminal database 413 may be the same as information input by the user 411 into the administrator server 401. After inputting the information into the terminal database 413, the user may connect the external server 410 including the terminal database 413 to the system server 400 to transmit the information. The user may input information on the electronic device into the terminal database 413 and then transmit the information to the system server 400 through an application programming interface 403. For example, the user may transmit data by inputting production information, model number, unique ID, and/or current specifications for the collected electronic device into the terminal database 413 in the external server 410 and uploading them to the system server 400.

According to various embodiments, the system server 400 may be configured by including at least one of the administrator server 401, the application programming interface 403, a storage 405, a validity module performing a first validity logic 407, and a first memory 409. When the user directly inputs data into the system server 400, the data may be input through the administrator server 401.

According to various embodiments, the system server 400 may store the received data in the storage 405 and store the data in the first memory 409 through the first validity logic 407. The first validity logic 407 may identify at least one of whether it is a normally produced electronic device, whether the model is supported by the system server 400, whether the unique ID of the electronic device is valid, or whether there is an error in the input data based on the received device information and production information. The first processor (e.g., the first processor 210 of FIG. 2) may generate a key table based on the received data. The key table may be configured by mapping the unique ID, the model number, the current specifications and production information for each unique ID, and may be stored in the first memory 409.

FIG. 5 illustrates a user input screen of a system server according to various embodiments.

According to various embodiments, the user may transmit device information from an external server (e.g., the external server 410 of FIG. 4) to the system server (e.g., the system server 200 of FIG. 2 or the system server 400 of FIG. 4). The user may directly input the device information to the system server, and/or input data into the terminal database (e.g., the terminal database 413 of FIG. 4) and link the data with the system server to register the data. FIG. 5 illustrates an input screen 500 when a user directly accesses an administrator server (e.g., the administrator server 401 of FIG. 4) without going through a terminal database, and inputs data to the system server.

Referring to FIG. 5, a second processor (e.g., the second processor 310 of FIG. 3) may display the user input screen 500 of the administrator server including a drop box 510 on the display. The user may directly input the numerical value of data (e.g., device information and production information) related to the electronic device on the screen 500 of the administrator server, and or may drag and drop the file that summarizes the data into the drop box 510 and upload the same.

According to various embodiments, in relation to the electronic device, the registered data may be stored in the storage (e.g., the storage 405 in FIG. 4) and then stored in the first memory (e.g., the first memory 409 of FIG. 4) through the first validity logic (e.g., the first validity logic 407 of FIG. 4). The first validity logic may identify at least one of whether it is a normally produced electronic device, whether the model is supported by the system server, whether the unique ID of the electronic device is valid, or whether there is an error in the input data based on the received device information and production information. The first processor (e.g., the first processor 210 of FIG. 2) may generate and store a key table in which information on at least one of a model number, a unique ID, and production information is mapped for each unique ID based on the received data.

Figure 6:
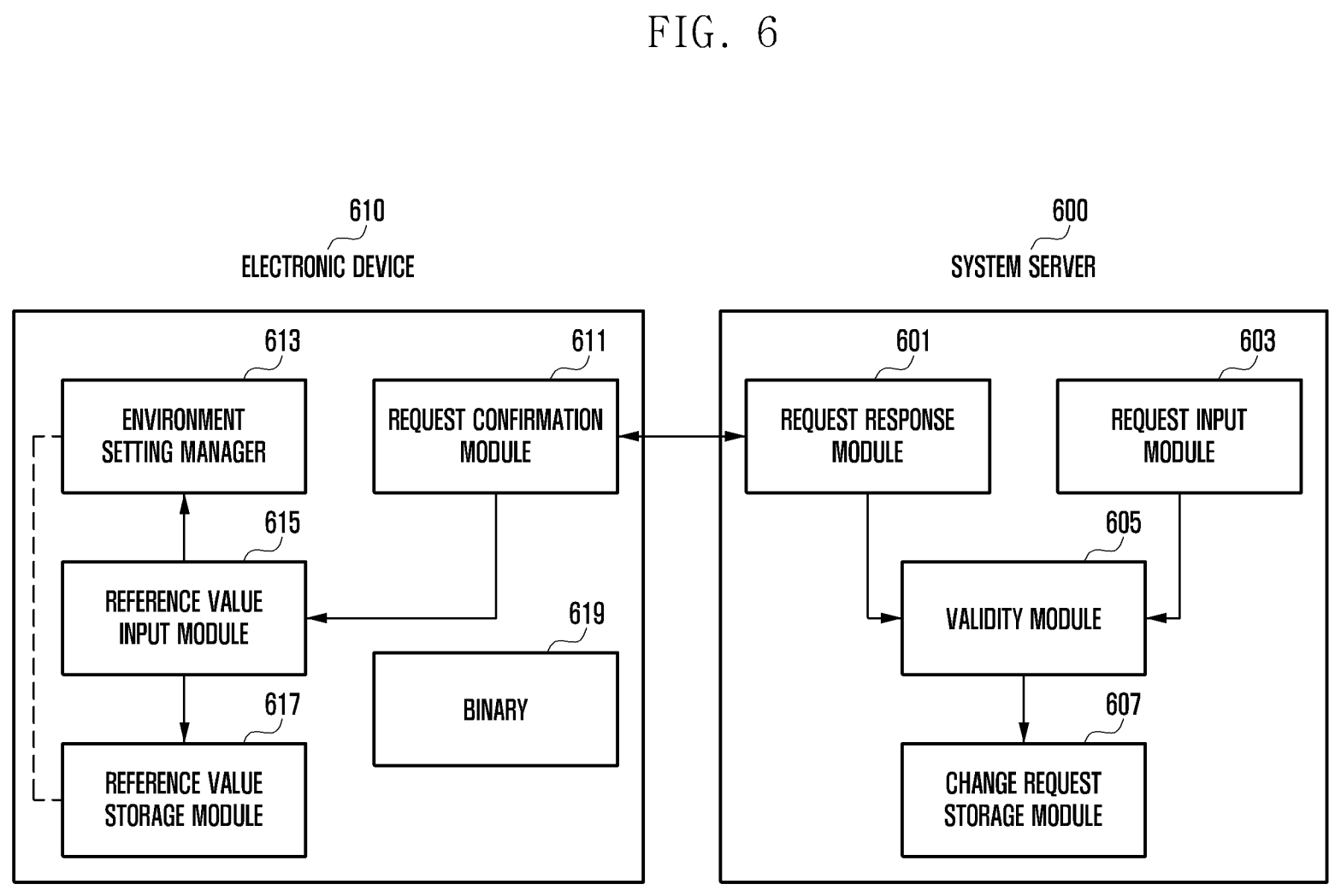

FIG. 6 is a configuration diagram of an electronic device and a system server according to various embodiments.

Referring to FIG. 6, the electronic device 610 (e.g., the electronic device 300 of FIG. 3) may be configured by including at least one of a request confirmation module 611, an environment setting manager 613, a reference value input module 615, a reference value storage module 617, and a binary 619, and the system server 600 (e.g., the system server 200 of FIG. 2 or the system server 400 of FIG. 4) may be configured by including at least one of a request response module 601, a request input module 603, a validity module 605 and a change request storage module 607. The electronic device 610 may store a plurality of binaries 619 of various operators, and which binary 619 to be installed may be determined based on a value in the reference value storage module 617. The corresponding value may be determined by the environment setting manager 613 and the reference value input module 615 may determine which binary 619 is to be installed based on the reference value storage module 617. Hereinafter, a communication method between the electronic device 610 and the system server 600 will be described focusing on the operation of each component.

According to various embodiments, device information input from an external server (e.g., the external server 410 of FIG. 4) to the system server 600 may be identified by the validity module 605, and the identified information may be stored in a first memory (e.g., the first memory 230 of FIG. 2). For example, the device information transmitted from the external server may be temporarily stored in a storage (e.g., the storage 405 of FIG. 4), and may be stored in the first memory in the form of a key table after undergoing a first validity logic (e.g., the first validity logic 407 of FIG. 4). The validity module 605 may execute the first validity logic by utilizing the key table and the production information stored in the first memory. When the device information passes the first validity logic, the identified information may be stored in the first memory. When the device information does not pass the first validity logic, the corresponding data may not be stored in the first memory and the system server 600 may terminate the access of the electronic device 610.

According to various embodiments, the electronic device 610 may identify whether a change is required in the system server 600 through the request confirmation module 611 at first booting after deleting existing user data, and for identifying, transmit unique state information including at least one of a unique ID of the corresponding electronic device 610, a model number, and information (e.g., current specification information) of the electronic device 610 to the system server 600.

According to various embodiments, the request response module 601 may determine whether the electron electronic device 610 is a normal terminal based on the information transmitted from the electronic device 610 through the validity module 605 and whether a change is required, and in case of a normal request, change information may be generated and transmitted to the electronic device 610. In other words, the system server 600 may determine whether the unique state information transmitted by the electronic device 610 through the request confirmation module 611 is a normal request through the second validity logic.

According to various embodiments, the request confirmation module 611 may receive change information and request the reference value input module 615 to make a change. The reference value input module 615 may input a value indicating the binary 619 to be changed to the reference value storage module 617 based on the corresponding change information.

According to various embodiments, the reference value input module 615 may update a value in the reference value storage module 617 and request the environment setting manager 613 to make a configuration change. The reference value storage module 617 may change (or update) the stored value with the value received from the reference value input module 615. The changed value may be a value indicating a specified condition, and the environment setting manager 613 may change the configuration of the electronic device 610 by referring to the value stored in the reference value storage module 617.

FIGS. 7A, 7B, 7C, and 7D illustrate a binary change screen of an electronic device according to various embodiments.

Figure 7A:
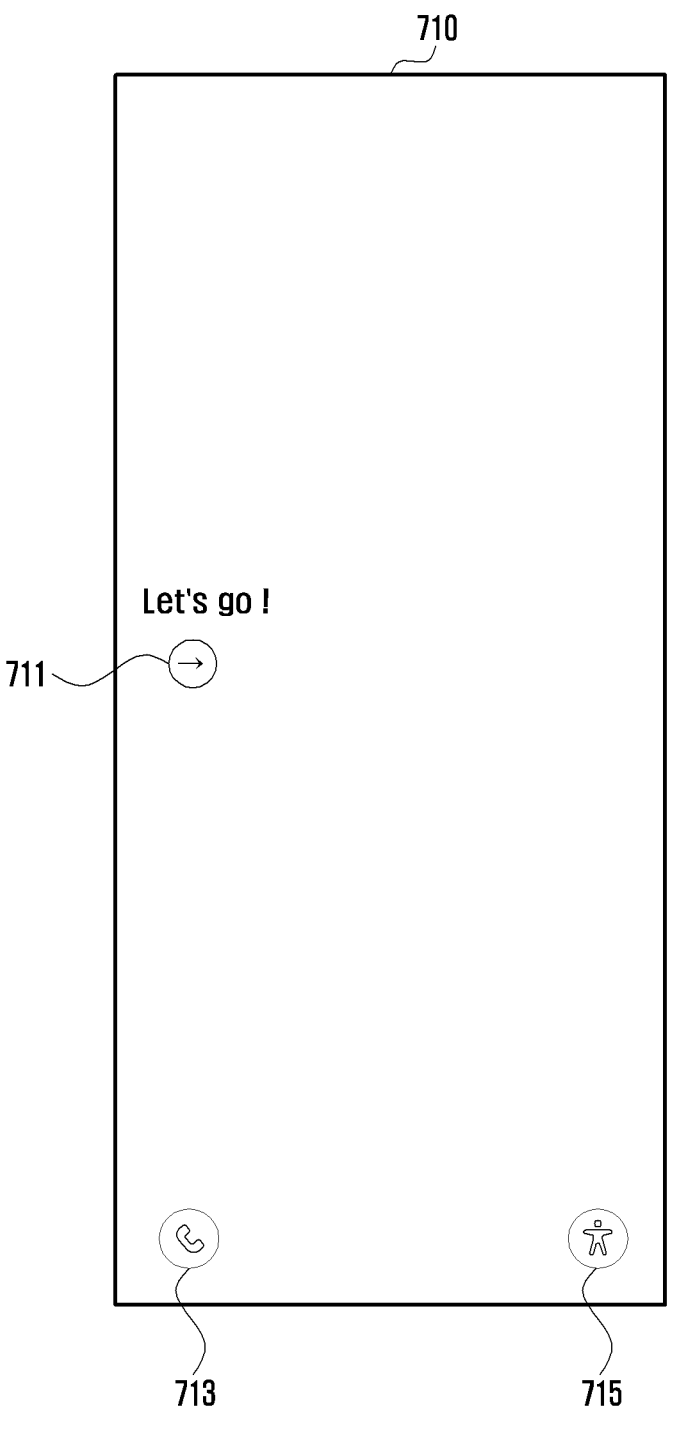
FIGS. 7A, 7B, 7C, and 7D illustrate a binary change screen of an electronic device according to various embodiments.

FIG. 7A illustrates a first screen 710 of an application for the binary change. The electronic device (e.g., the electronic device 300 of FIG. 3 or the electronic device 610 of FIG. 6) may transmit unique state information to a system server (e.g., the system server 200 of FIG. 2, the system server 400 of FIG. 4, or the system server 600 of FIG. 6), and receive change information related to the binary change from the system server. According to an embodiment, a first graphic object (e.g., a next button 711) for moving to the next screen may be displayed on the first screen 710, and a second processor (e.g., the second processor 310 of FIG. 3) may receive a user input (e.g., touch or click) for the first graphic object (e.g., the next button 711) and switch to the second screen 720. According to an embodiment, the second processor may receive a user input for the entire first screen 710, not only the first graphic object (e.g., the next button 711) and switch to the next screen. A second graphic object 713 for emergency calls and a third graphic object 715 for additional configurations may be additionally displayed on one side of the first screen 710. In order to perform a communication method, the second processor may display the second screen 720 on the display based on the user input.

Figure 7B:
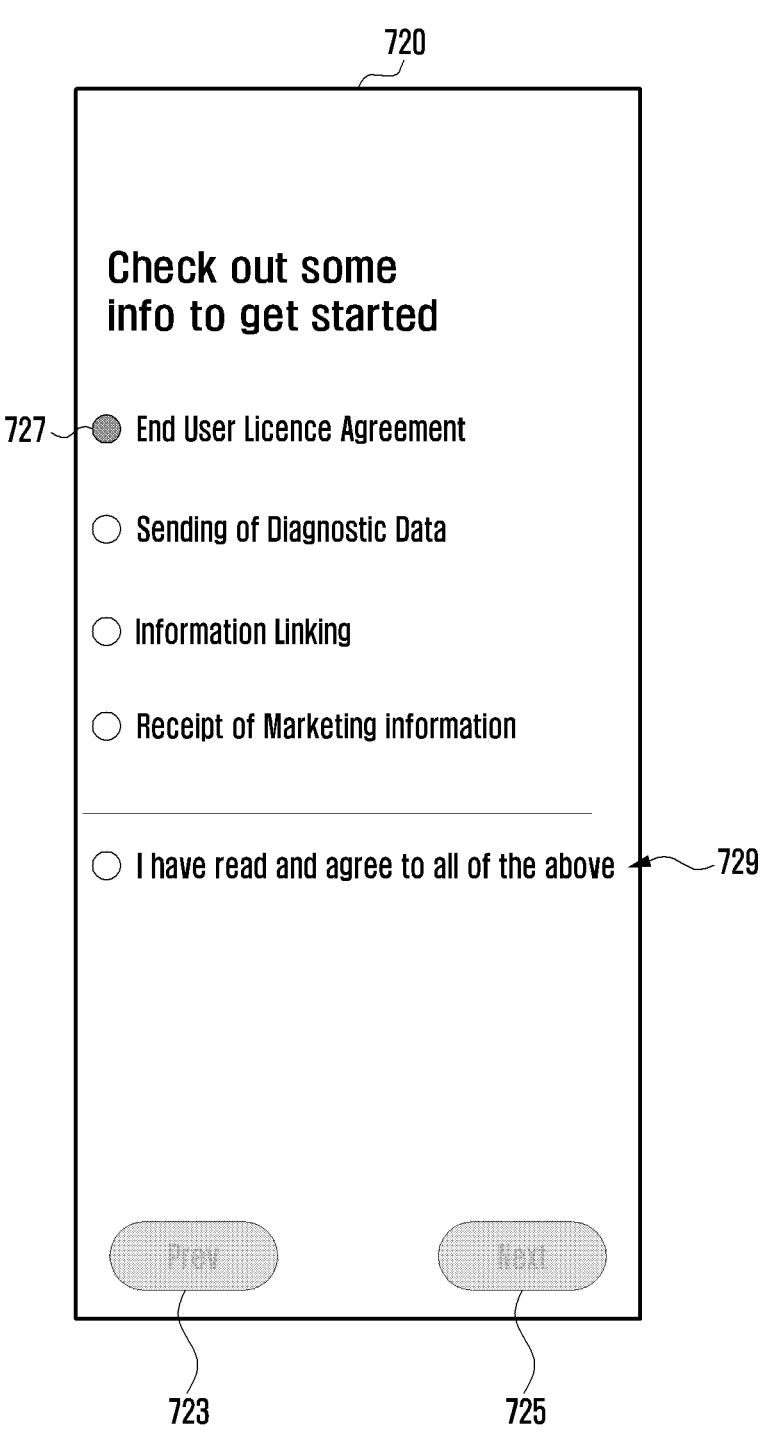

FIG. 7B illustrates the second screen 720 for receiving user consent for application execution. The second processor (e.g., the second processor 310) may determine whether to agree to at least one of a license, diagnostic data transmission, information connection, and marketing information provision based on a user input on the second screen 720. On a side of each item, a fourth graphic object 727 capable of displaying whether to confirm and consent may be displayed, and on a side of the second screen 720, a fifth graphic object 729 capable of checking that all contents are confirmed and agreed may be displayed. For example, the user may touch the fourth graphic object 727 to check four items that are a license, diagnostic data transmission, information linking, and marketing information provision one by one. Agreeing on all items may be checked simultaneously by touching the fifth graphic object 729.

According to various embodiments, a sixth graphic object (e.g., a previous button 723) for returning to the previous screen and a seventh graphic object (e.g., a next button 725) for moving to the next screen may be additionally displayed on the second screen 720. When all items are not checked, the seventh graphic object 725 may not be activated. For example, if a user wants to return to the previous screen, the user may return to the previous screen by touching the previous button 723, and may move to the next screen by checking all items and touching the next button 725. When all items are not checked, even if the user touches the next button 725, the screen may not move to the next screen.

Figure 7C:
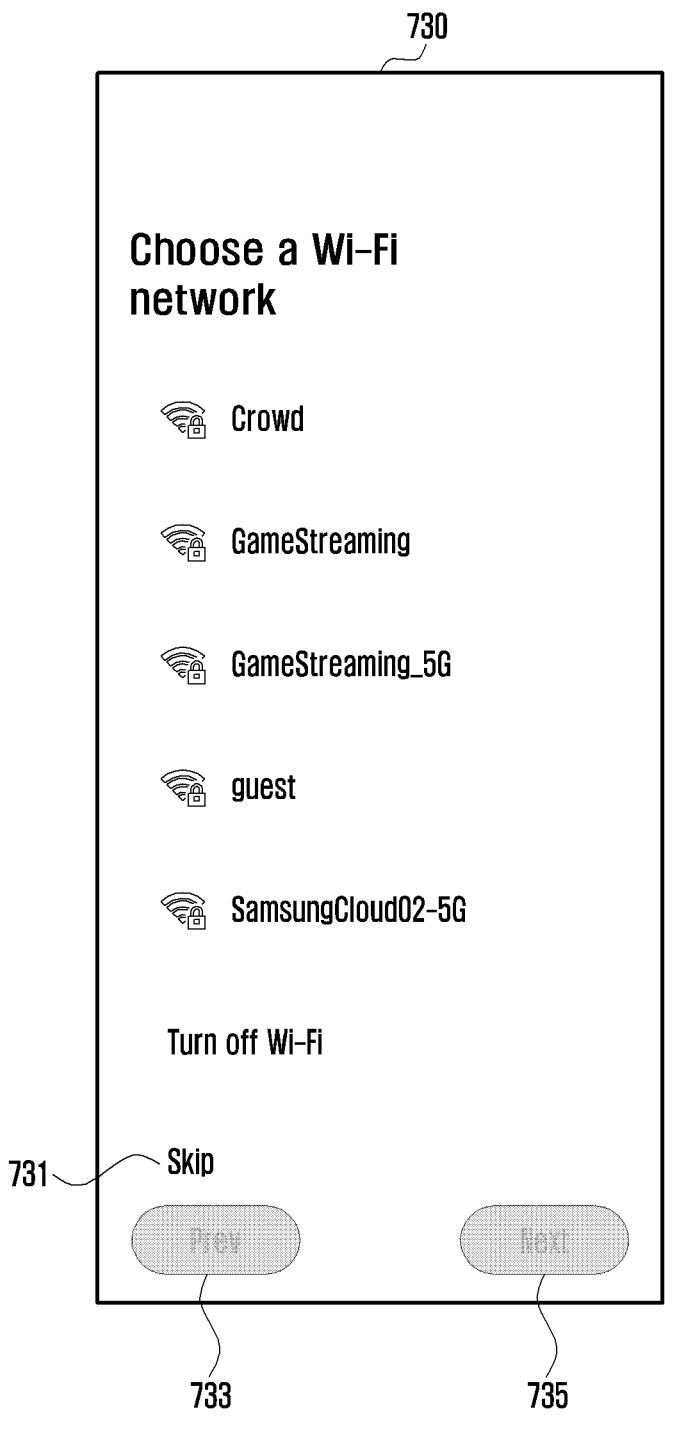

FIG. 7C illustrates a third screen 730 for wireless connection to execute an application. An electronic device (e.g., the electronic devices 300 and 610) and a system servers (e.g., the system servers 200, 400, and 600) may need to be connected to a wireless network (e.g., Wi-Fi, Bluetooth) for wireless communication. The second processor (e.g., the second processor 310) may search for a wireless network for connection, and if not necessary, stop searching for a wireless network or move directly to the next screen based on the user input. According to various embodiments, the third screen 730 may additionally include at least one of a previous button 733 for returning to the previous screen, a next button 735 for moving to the next screen, and a skip button 731 for moving to the next screen without selecting a wireless network.

Figure 7D:
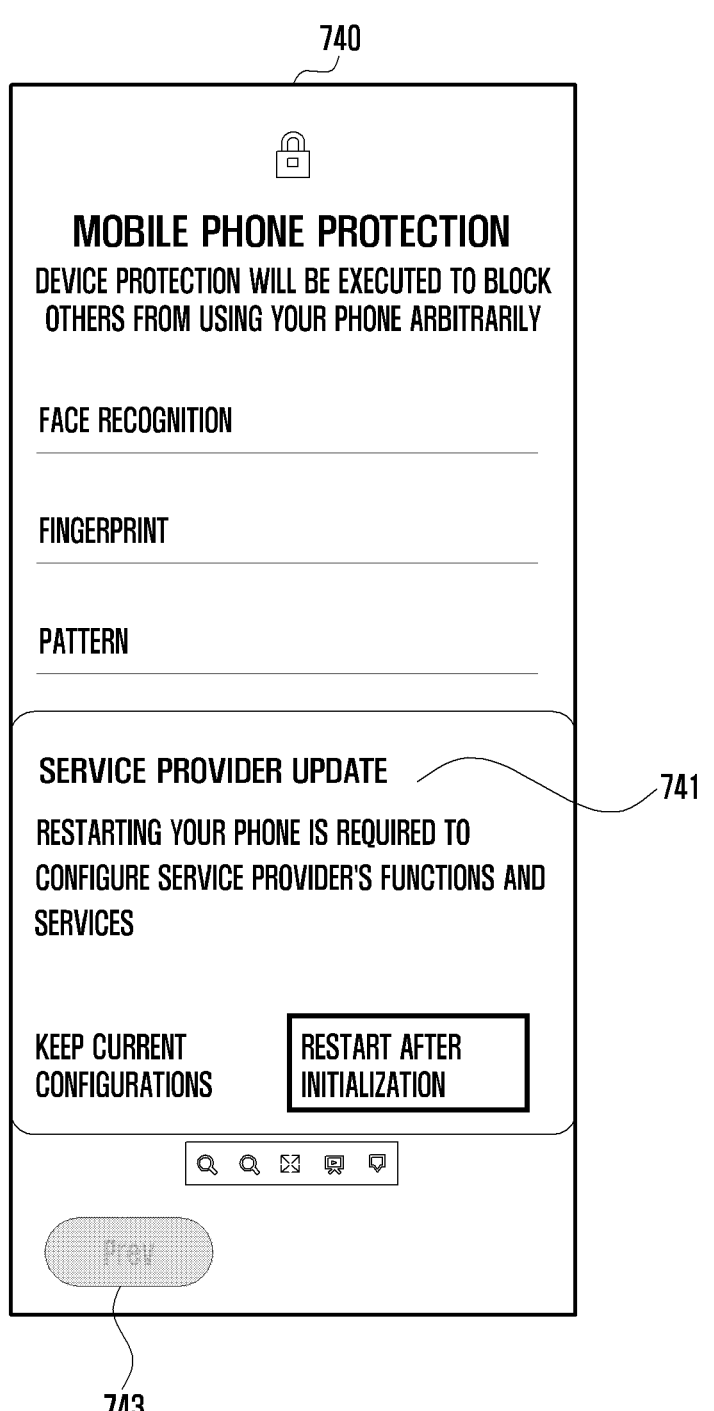

FIG. 7D illustrates a fourth screen 740 in which the electronic device (e.g., the electronic devices 300 and 610) may select whether to initialize in order to change the binary after receiving the change information from the system server (e.g., the system servers 200, 400, and 600). According to various embodiments, the fourth screen 740 may include a security screen for protecting personal information in the electronic device while updating the binary. The security screen may block access of a person other than the user to the electronic device by using at least one of face recognition, fingerprint recognition, and pattern recognition. According to an embodiment, the fourth screen 740 may further include a previous button 743 for returning to the previous screen.

According to various embodiments, the fourth screen 740 may include a service provider update screen 741. The second processor may delete existing user data of the electronic device and reboot the electronic device in order to reinstall the software. The fourth screen 740 may provide a menu for selecting whether to receive information on deletion and change of the existing user data. For example, when the user clicks the 'restart after initialization' button, the second processor may access the system server by deleting the existing user data stored in the second memory (e.g., the second memory 340) and rebooting. The second processor may receive change information from the system server and change binary information.

The system server 200 according to various embodiments may include a first communication module 220 for communicating with the electronic device 300 and the external server 410, the first memory 230 storing device information and production information on a plurality of electronic devices 300 received from the external server 410, and the first processor 210 operatively connected to the first communication module 220 and the first memory 230, and the first processor 210 may receive unique state information from the electronic device 300 that has accessed the system server 200, compare the received unique state information with the device information on the plurality of electronic devices 300 stored in the first memory 230 so as to determine whether a binary change is required in the electronic device 300, generate change information including information on a binary to be changed, and transmit the generated change information to the electronic device 300.

According to various embodiments, the first processor 210 may communicate with an external server 410 by using the first communication module 220, and receive the device information and the production information based on a user input and/or in conjunction with the terminal database 413.

According to various embodiments, a first validity logic identifying at least one of whether it is a normally produced terminal, whether it is a supported model, whether an ID is valid, and whether there is no error in input data based on the received device information and production information may be further included.

According to various embodiments, the first processor 210 may map the received device information according to specified criteria to generate a key table, and store the key table in the first memory 230.

According to various embodiments, the first processor 210 may determine whether it is a valid electronic device through an authentication process when the electronic device 300 has accessed the system server 200, and receive unique state information when it is determined to be a valid electronic device.

According to various embodiments, a second validity logic verifying at least one of whether the electronic device 300 is actually produced electronic device, whether an ID is a normal unique ID, and whether the electronic device 300 is a normal electronic device, based on the unique state information received from the electronic device 300 may be further included.

According to various embodiments, the change information generated by the first processor 210 may include information on a second binary to be changed when a change to a first binary applied to the electronic device 300 is required, and may not include information on a second binary when a change to a binary is not required.

An electronic device 300 according to various embodiments may include the second communication module 320 for communicating with the system server 200, a second memory 340 storing unique state information including at least one of a unique ID, a model number, and binary information of a terminal, user data, and a plurality of binary, and the second processor 310 operatively connected to the second communication module 320 and the second memory 340, wherein the second processor 310 may access the system server 200, transmit the unique state information to the system server 200, receive change information on first binary applied to the electronic device 300 from the system server 200, and change binary information based on the received change information.

According to various embodiments, the second processor 310 may delete the user data of an electronic device 300, and access the system server 200 automatically at first booting after the user data deletion process.

According to various embodiments, the second processor 310, based on the received change information when a configuration change is required, may change a first binary to a second binary when a specified second binary exists in the change information, and initialize the binary information when a specified binary does not exist.

According to various embodiments, the second processor 310 may identify whether the change information received from the system server 200 is applied, and determine whether to change binary information based on a user input.

According to various embodiments, the binary may be preloaded in the electronic device 300 and/or downloaded through the system server 200, and may include at least one of configuration values, applications, and resources capable of meeting requirements of operators and countries.

Figure 8:
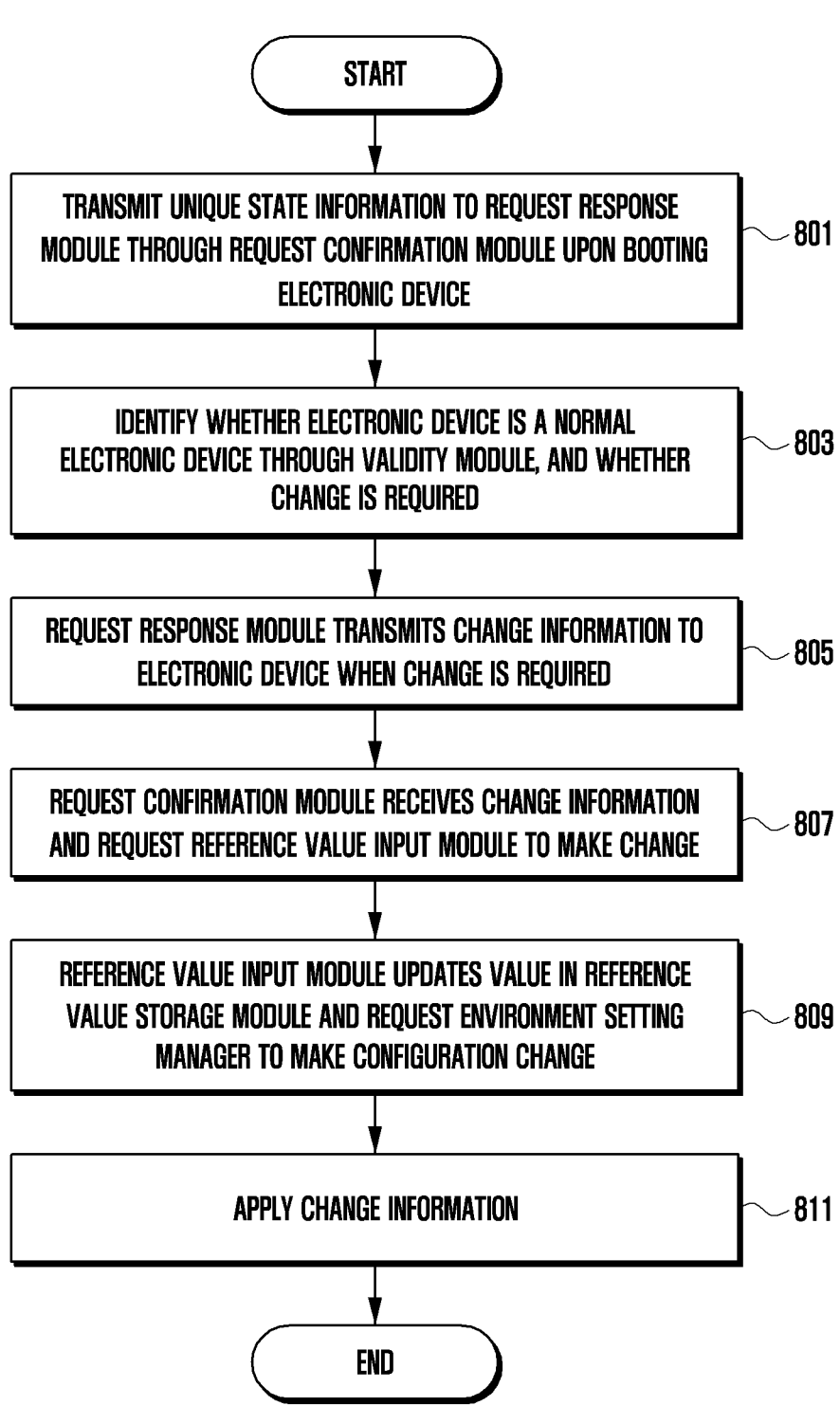
FIG. 8 is a flowchart of a binary change method of an electronic device according to various embodiments.

FIG. 8 is a flowchart of a binary change method of an electronic device according to various embodiments.

According to various embodiments, the operations illustrated in FIG. 8 may be understood as operations performed by a processor (e.g., the processor 120 of FIG. 1 or the second processor 310 of FIG. 3) of an electronic device (e.g., the electronic device 101 of FIG. 1, the electronic device 300 of FIG. 3, or the electronic device 610 of FIG. 6) and a processor (e.g., the first processor 210 of FIG. 2) of a system server (e.g., the server 108 of FIG. 1, the system server 200 of FIG. 2, the system server 400 of FIG. 4, or the system server 600 of FIG. 6).

According to various embodiments, in operation 801, the electronic device 610 may delete existing user data and transmit unique state information to a request response module (e.g., the request response module 601) through a request confirmation module (e.g., the request confirmation module 611) upon booting. The system server 600 may detect the access of the electronic device 610 and identify whether the corresponding electronic device 610 has authority to access the system server 600 or whether the corresponding electronic device is an unauthorized product through an authentication process. When the electronic device 610 is an unauthorized product, the electronic device 610 may not pass the authentication process and the system server 600 may block access of the electronic device 610.

According to various embodiments, the electronic device 610 may be configured to delete existing user data and access the system server 600 upon first booting. For example, a screen (e.g., the first screen 710 of FIG. 7A) for accessing the system server 600 by executing an application on the electronic device 610 may be displayed. The user may manipulate the screen to delete existing user data stored in the memory (e.g., the second memory 340 of FIG. 3) of the electronic device 610 and access the system server 600. The operation of deleting existing user data and accessing the system server 600 upon first booting may occur based on a user input or may be configured in an application to be automatically executed.

According to various embodiments, in operation 803, the electronic device 610 may identify whether the electronic device 610 is a normal electronic device through a validity module. The validity module (e.g., the validity module 605) may determine at least one of whether the electronic device 610 is actually manufactured and whether the unique ID is normal, by using a validity logic (e.g., the second validity logic) based on the currently loaded software version information and received production information. The validity module may obtain at least one of software version information and product information required for validity logic from a memory (e.g., the first memory 230).

According to various embodiments, the system server 600 may identify whether a binary change is required through a validity module. In order to identify whether the binary change is required, the validity module may inquire a key table stored in a memory (e.g., the first memory 230). The key table may be generated by a processor (e.g., the first processor 210 of FIG. 2) mapping information on the electronic device 610 for each unique ID. The key table may include at least one of a model number, a unique ID, current specifications, and production information, and other various information on the corresponding electronic device 610 may be included in the key table. The system server 600 may inquire the key table by using the unique ID of the received unique state information as a keyword, and determine whether the binary change is possible for the corresponding electronic device 610.

According to various embodiments, the system server 600 may generate change information. The change information may include at least one of whether the binary of the electronic device 610 having accessed the system server 600 needs to be changed and information on the binary to be changed. When the electronic device 610 requires a binary change, the change information may include information indicating the binary to be changed. When the electronic device 610 does not require the binary change, the change information may not include binary information.

According to various embodiments, in operation 805, the system server 600 may transmit change information to the electronic device 610 when a request response module (e.g., the request response module 601) requires change. The request response module may communicate with the request confirmation module (e.g., the request confirmation module 611) of the electronic device 610 to transmit change information. According to another embodiment, the request response module may transmit the generated change information to the request confirmation module even when binary change is not required. In this case, the change information may not include binary information indicating the binary to be changed to the electronic device 610.

According to various embodiments, a plurality of binaries may exist in the electronic device 610. Existing binaries and multiple operator software binaries may exist. The change information may include content to indicate and change one binary among the plurality of binaries existing in the electronic device 610.

According to various embodiments, in operation 807, the request confirmation module in the electronic device 610 may receive change information and request a reference value input module (e.g., the reference value input module 615) to make a change. According to various embodiments, the request confirmation module may identify change information and binary information included in the change information. When the binary needs to be changed, the request confirmation module may transfer a value indicating the binary to be changed based on the identified binary information to the reference value input module. For example, among the binaries (e.g., the binary 619 of FIG. 6) stored in the electronic device 610, a value indicating an already applied binary is 100, and a value indicating a binary to be changed included in the binary information is 200, the request confirmation module may transmit the value of 200 to the reference value input module.

According to various embodiments, when the change information does not include binary information, the request confirmation module may transmit a value indicating the previously applied binary or a value indicating that there is no change information to the reference value input module. For example, when the value indicating the previously applied binary is 100 and the change information received from the request response module does not include binary information, the request confirmation module may transmit the value of 100 to the reference value input module as it is, and notify that there is no need to change the binary. Alternatively, the value (e.g., 0) indicating that there is no change information may be transmitted to the reference value input module to notify that there is no need to change the binary. According to an embodiment, when the binary information is not included in the change information, the request confirmation module may not send any value to the reference value input module. When there is no binary input, the reference value input module may recognize that there is no binary change.

According to various embodiments, in operation 809, the reference value input module in the electronic device 610 may update a value in a reference value storage module (e.g., the reference value storage module 617) and request an environment setting manager (e.g., the environment setting manager 613) to make a configuration change. According to various embodiments, the reference value input module may identify binary information included in the change information received from the request confirmation module, and store the value indicating the binary to be changed in the reference value storage module as it is.

According to various embodiments, the reference value input module may request the environment setting manager to make a configuration change. The environment setting manager may select and apply a necessary binary among a plurality of binaries by referring to the value stored in the reference value storage module.

According to various embodiments, in operation 811, the electronic device 610 may apply the received change information. The received change information may include binary information indicating the binary to be changed, and the electronic device 610 may configure new software by selecting a binary that matches binary information among a plurality of binaries based on a user input.

According to various embodiments, the electronic device 610 may identify whether to change the software binary according to the received change information. For example, when the first binary is previously applied to the electronic device 610 and the change information asks to change to the second binary, the electronic device 610 may identify the change information and may not change to the second binary based on the user input.

Figure 9:
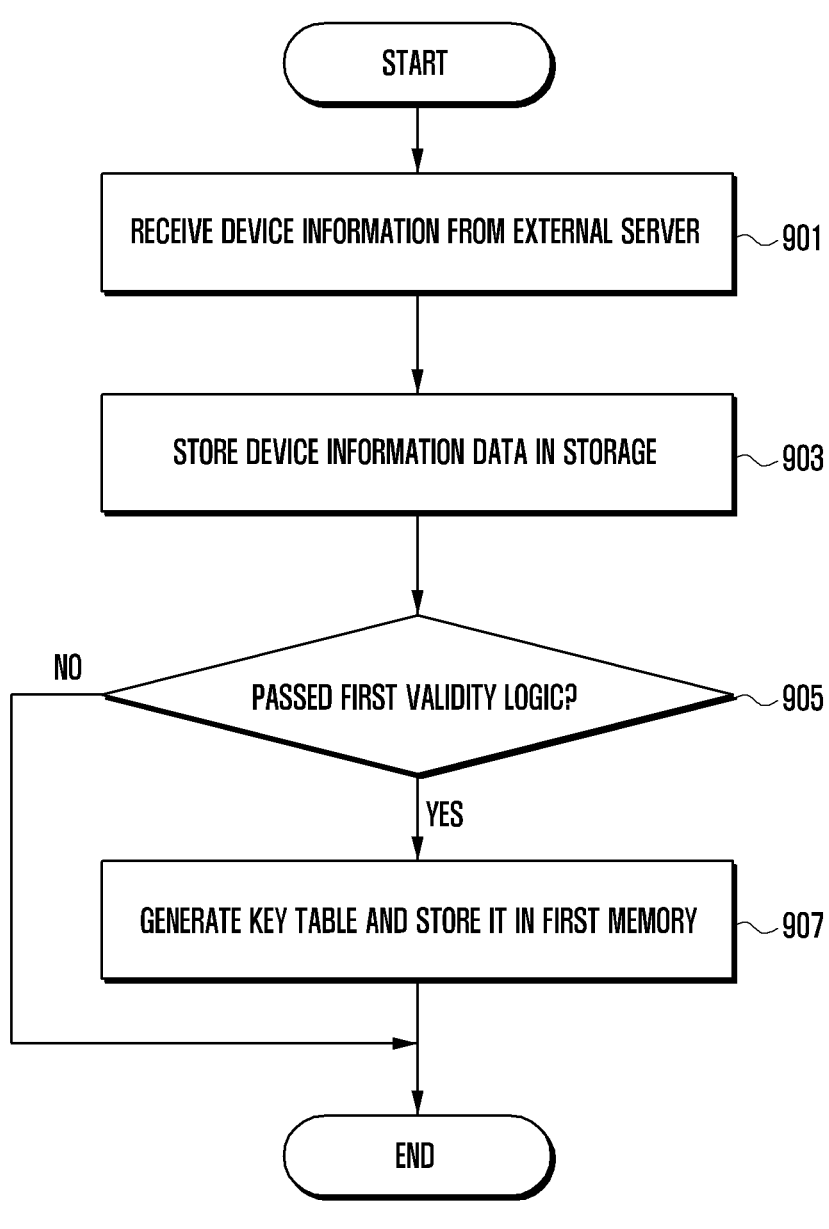
FIG. 9 is a flowchart illustrating operations of an external server and a system server according to various embodiments.

FIG. 9 is a flowchart illustrating operations of an external server and a system server according to various embodiments.

According to various embodiments, the operations illustrated in FIG. 9 may be understood as operations performed by a processor (not illustrated) of an external server (e.g., the external server 410 of FIG. 4) and a processor (e.g., the first processor 210 of FIG. 2) of a system server (e.g., the server 108 of FIG. 1, the system server 200 of FIG. 2, the system server 400 of FIG. 4, or the system server 600 of FIG. 6).

Referring to FIG. 9, the system server 400 may receive device information from the external server 410 in operation 901. According to an embodiment, a user accessing the external server 410 may directly input data into an administrator server (e.g., the administrator server 401) within the system server 400. Input may be input for each unique ID, or multiple IDs may be input simultaneously by using a predefined format. For example, information on used terminals collected by used phone dealerships may be directly input into the administrator server. According to another embodiment, a user may input data into a terminal database (e.g., the terminal database 413) in the external server 410 without directly inputting data into the system server 400. Data input into the terminal database may be the same as information input by the user to the administrator server.

According to various embodiments, a user may input information into the terminal database and transmit the information by connecting to the system server 400. The system server 400 may receive information on an electronic device input into the terminal database through an application programming interface. For example, the production information, the model number, the unique ID, and/or current specifications of the electronic device collected by the user may be input into the terminal database on the external server 410, and the external server 410 may transmit data by uploading the same to the system server 400.

According to various embodiments, the system server 400 may be configured by including at least one of an administrator server, an application programming interface (e.g., the application programming interface 403), a storage (e.g., the storage 405), and a first memory. When the user directly inputs data into the system server 400, the data may be input through the administrator server.

According to various embodiments, in operation 903, the system server 400 may store the received data in the storage. The storage may temporarily store the information received from the external server before storing the same in a memory (e.g., the first memory 409 of FIG. 4). Information received through the administrator server may be immediately stored in the storage, and information received from the terminal database may be stored in the storage through the application programming interface.

According to various embodiments, in operation 905, the system server 400 may determine whether the device information and the production information transmitted by the external server pass the first validity logic. The first validity logic may identify at least one of whether the electronic device is a normally produced electronic device, whether the model is supported by the system server, whether the unique ID of the electronic device is valid, or whether there is an error in the input data based on the received device information and production information. According to an embodiment, the system server 400 may transmit device information and production information stored in the storage to the validity module.

According to various embodiments, when the device information and the production information transmitted by the external server do not pass the first validity logic, the system server 400 may terminate the process and block access the electronic device. According to an embodiment, when the device information and the production information transmitted by the external server do not pass the first validity logic and the process is terminated, the system server 400 may delete the device information and the production information stored in the storage.

According to various embodiments, in operation 907, when the received device information and production information pass the first validity logic, the system server 400 may generate a key table based on this and store the information in the first memory (e.g., the first memory 409). According to an embodiment, the system server 400 may configure the key table by mapping at least one of the unique ID, the model number, current specifications, and production information of the electronic device for each unique ID, and may store the key table in the first memory. The system server 400 may generate change information by referring to the key table.

Figure 10:
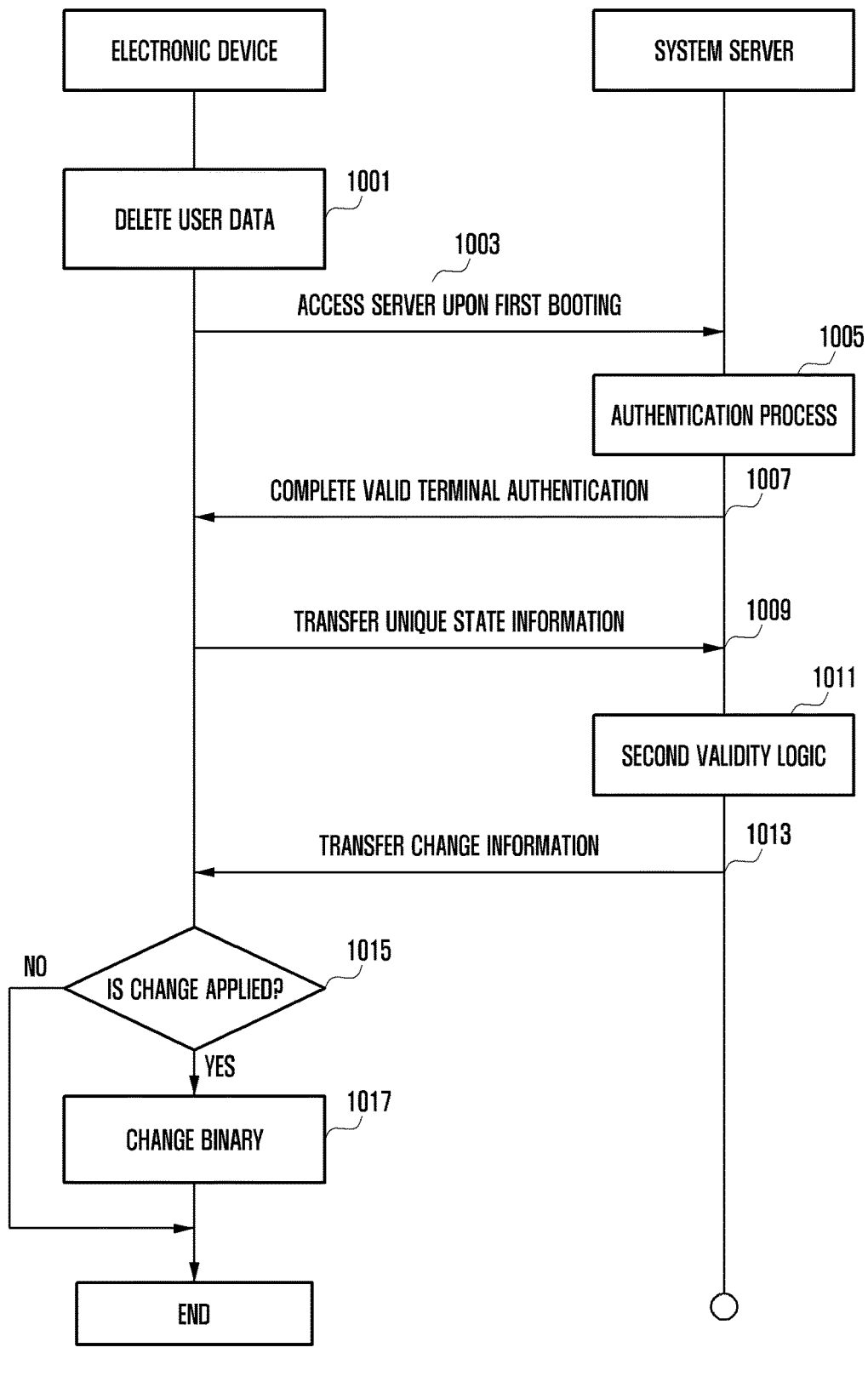
FIG. 10 is a flowchart illustrating operations of an electronic device and a system server according to various embodiments.

FIG. 10 is a flowchart illustrating operations of an electronic device and a system server according to various embodiments.

According to various embodiments, the operations illustrated in FIG. 10 may be understood as operations performed by a processor (e.g., the processor 120 or the second processor 310) of an electronic device (e.g., the electronic devices 101, 300, and 610) and a processor (e.g., the first processor 210) of a system server (e.g., the server 108, the system servers 200, 400, and 600).

According to various embodiments, the electronic device 610 may include at least one of a request confirmation module, an environment setting manager, a reference value input module, a reference value storage module, and a binary, and the system server 600 may include at least one of a request response module, a request input module, a validity module, and a change request storage module. The electronic device 610 may store a plurality of binaries of various operators, and which binary to install may be determined based on a value in the reference value storage module. The corresponding value may be determined by the environment setting manager, and the reference value input module may determine which binary to install based on the reference value storage module.

According to various embodiments, device information input from an external server to the system server 600 may be identified by a validity module (e.g., the first validity logic 407), and the identified information may be stored in the first memory. For example, device information and production information transmitted from the external server may be temporarily stored in a storage, and may be stored in the first memory in the form of a key table after passing the first validity logic. When the device information passes the first validity logic, the identified information may be stored in the first memory. When the device information does not pass the first validity logic, the corresponding data is not stored in the first memory and the system server 600 may terminate the access of the electronic device 610. The validity module may execute the second validity logic by utilizing the key table and production information stored in the first memory.

According to various embodiments, in operation 1001, the electronic device 610 may delete existing user data stored in a memory (e.g., the second memory 340 of FIG. 3). For example, an environment for use by a new user may be provided by deleting phone numbers, applications, binaries, biometric information, or resources registered by the existing user.

According to various embodiments, in operation 1003, the electronic device 610 may be configured to access the system server 600 when booting for the first time after deleting existing user data. Operations of booting and accessing the server may be performed continuously, or may be performed discontinuously based on a user input. According to another embodiment, even in the case that the booting is not a booting performed for the first time after deleting the user data, if the electronic device 610 does not receive change information from the system server 600, the electronic device may be configured to access the system server 600 upon booting.

According to various embodiments, in operation 1005, the electronic device 610 may undergo an authentication process. The authentication process may include an operation of identifying whether the corresponding electronic device 610 has authority to access the system server 600 or whether the corresponding electronic device is not an unauthorized product. If the electronic device 610 does not pass the authentication process, access to the system server 600 may be blocked. In operation 1007, the electronic device 610 may be authenticated as a valid electronic device.

According to various embodiments, in operation 1009, the electronic device 610 may transmit unique state information to the system server 600. The unique state information may include at least one of a model number transmitted by the electronic device 610, a unique ID, and current specifications. According to an embodiment, the electronic device 610 may transmit unique state information to the request response module of the system server 600 through the request confirmation module.

According to various embodiments, in operation 1011, the system server 600 may execute the second validity logic to determine at least one of whether the electronic device is actually produced and whether the unique ID is normal, based on the currently loaded software version information and the received production information.

According to various embodiments, when the electronic device 610 passes the second validity logic, the system server 600 may determine whether a binary change is necessary, generate change information, and transmit the same to the electronic device 610. In other words, the system server 600 may determine whether the unique state information transmitted by the electronic device 610 through the request confirmation module is a normal request through the second validity logic.

According to various embodiments, in operation 1013, the system server 600 may generate change information and transmit the generated change information to the electronic device 610. The system server 600 may generate change information by referring to the key table stored in the memory (e.g., the first memory 230 of FIG. 2). For example, it is possible to determine whether a binary change of the electronic device 610 is necessary, and to generate change information including information on the binary to be changed.

According to various embodiments, in operation 1015, the electronic device 610 may receive change information from the system server 600 and determine whether to apply the change. When the change information includes binary information indicating a binary to be changed, the electronic device 610 may change the binary by referring to the change information. That is, the environment setting manager may be configured to change the binary by inputting a value indicating the binary to be changed in the reference value storage module. According to an embodiment, the electronic device 610 may determine whether to apply the change information based on a user input.

According to various embodiments, in operation 1017, the electronic device 610 may change the binary by referring to the change information. For example, when the electronic device 610 includes change information to change the previously applied first binary to the second binary, the electronic device 610 may apply the second binary among a plurality of binaries.

Figure 11:
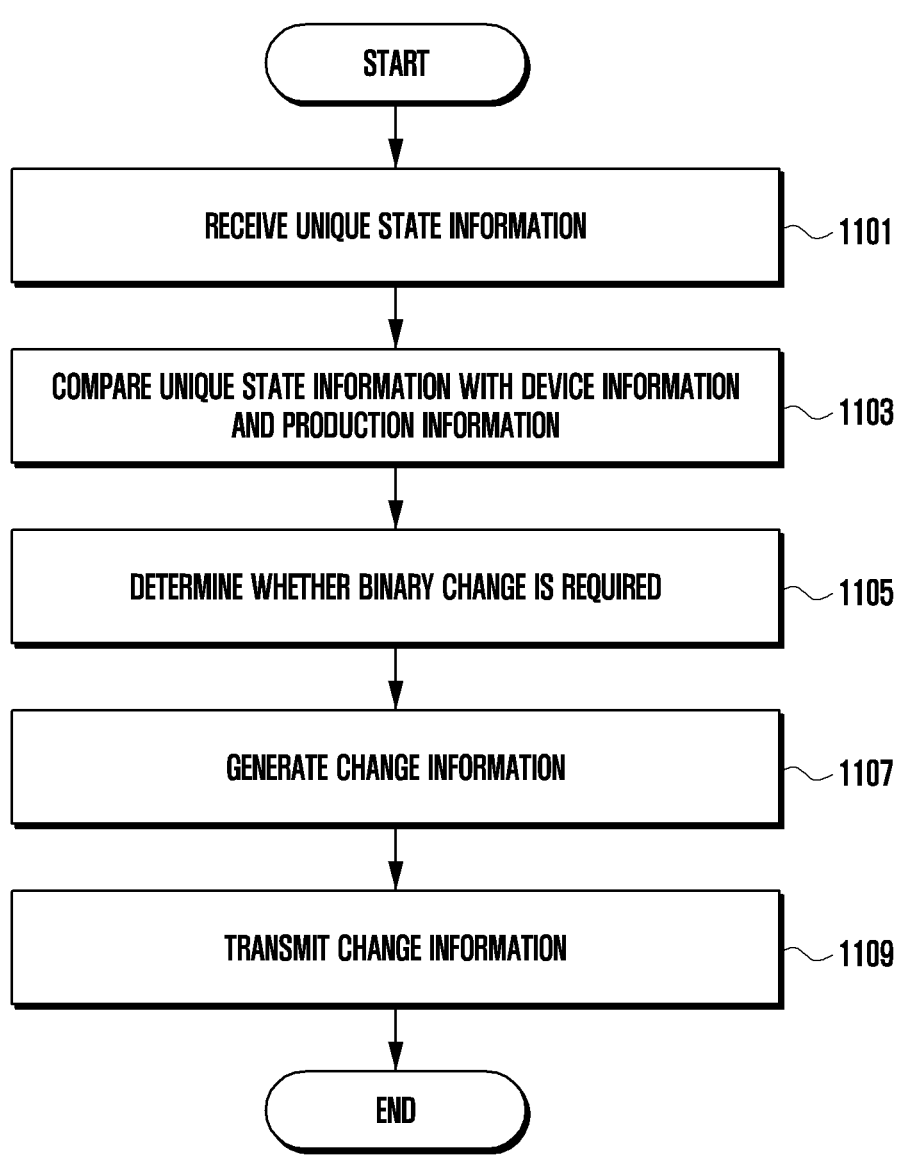
FIG. 11 is an operation flowchart of a system server according to various embodiments.

FIG. 11 is an operation flowchart of a system server according to various embodiments.

According to various embodiments, the system server 600 may receive at least one of device information and production information from an external server. The device information and/or the production information may be directly input by a user or received from a database in the external server. The system server 600 may store the received device information and the received production information in the first memory through the first validity logic for identifying whether the received device information and the received production information are valid.

According to various embodiments, in operation 1101, the system server 600 may receive unique state information from the electronic device 610. When the electronic device 610 has accessed the system server, the system server 600 may identify whether the electronic device 610 is valid through a second validity logic. When it is confirmed that the accessed electronic device 610 is valid, the system server 600 may receive unique state information including at least one of a model number, a unique ID, and current specifications transmitted by the electronic device 610.

According to various embodiments, in operation 1103, the system server 600 may compare the device information and the production information stored in the memory with the unique state information received from the electronic device 610, and, in operation 1105, the system server 600 may determine whether a binary change is required. The system server 600 may determine that the binary change is not necessary according to the user's intention.

According to various embodiments, in operation 1107, the system server 600 may generate change information. The change information may include information on the binary of the electronic device 610 to be changed. For example, when a first binary is applied to the electronic device 610 and may be changed to a second binary, the change information may include information on the second binary. According to an embodiment, when the binary of the electronic device 610 does not need to be changed, the change information may not include information on the binary or may include information indicating that there is no change.

According to various embodiments, in operation 1109, the system server 600 may transmit the change information to the electronic device 610. The system server 600 may communicate with the request confirmation module of the electronic device 610 through the request response module. The system server 600 may transmit the change information to the electronic device 610 by using a corresponding communication channel.

A binary change method of an electronic device according to various embodiments may include accessing the system server 200 by the electronic device 300, transmitting unique state information to the system server 200, receiving change information on first binary applied to the electronic device 300, and changing binary information based on the received change information.

According to various embodiments, the accessing the system server 200 may include deleting the user data of the electronic device 300, and accessing the system server 200 automatically at first booting after the user data deletion process.

According to various embodiments, the changing the binary information, based on the received change information, may include changing the first binary to the second binary when a specified second binary exists in the change information, and initializing the binary information when a specified binary does not exist.

According to various embodiments, the changing the binary information may include identifying whether the change information received from the system server 200 is applied, and determining whether to change binary information based on a user input.

According to various embodiments, the system server 200 may store device information in the system server 200 based on a user input and/or in conjunction with the terminal database 413, compare unique state information and device information of the electronic device 300 to determine whether a binary change is required for the electronic device 300, generate change information including information on a binary to be changed, and transmit the generated change information to the electronic device 300.

According to various embodiments, the system server 200 may identify at least one of whether the electronic device is a normally produced terminal, whether the model of the electronic device is a supported model, whether an ID is valid, and whether there is no error in input data based on production information.

According to various embodiments, the system server 200 may determine whether the electronic device is valid through an authentication process in the system server 200 and receive the unique state information.

According to various embodiments, the system server 200 may further include a second validity logic verifying at least one of whether it is actually produced electronic device, whether it is a normal unique ID, and whether it is a normal electronic device, based on the unique state information received from an electronic device 300.

According to various embodiments, a user may change an operator software binary fixed to a terminal to another operator binary or to a self-sufficient terminal by using a corresponding system.

In addition, effects that may be obtained or predicted due to various embodiments of the disclosure are directly or implicitly disclosed in the detailed description of the embodiments of the disclosure. For example, various effects expected according to various embodiments of the disclosure are disclosed within the detailed description.

Meanwhile, in the detailed description of the present disclosure, specific embodiments have been described, but various modifications are possible without departing from the scope of the present disclosure. Therefore, the scope of the present disclosure should not be limited to and defined by the described embodiments and should be defined by the scope of the claims described below as well as equivalents to the scope of these claims.

What is claimed is:

1. A system server comprising:
   a communication module configured to communicate with an electronic device and an external server;
   a validity module configured to perform a validity logic;
   memory configured to store instructions, device information and production information on a plurality of electronic devices received from the external server;
   at least one processor operatively connected to the communication module, the validity module and the memory,
   wherein the instructions, when individually or collectively executed by the at least one processor, cause the system server to:
      download device information and production information of the electronic device from the external server through an application programming interface (API) based on the external server being connected to the system server, the external server comprising a database including the device information and the production information of the electronic device,
      temporarily store the downloaded device information and production information in a storage,
      control the validity module to perform a first validity logic for identifying validity of the device information and the production information temporarily stored in the storage, and
      store, in the memory, the device information and the production information temporarily stored in the storage based on the validity of the device information and the production information being identified, the storage being different from the memory, and
   wherein the at least one processor is further configured to:
      determine whether the electronic device is a valid electronic device through an authentication process based on the electronic device accessing the system server automatically at a first booting after user data of the electronic device is deleted,
      receive unique state information from the electronic device based on the electronic device being determined as the valid electronic device,
      control the validity module to perform a second validity logic for verifying the electronic device based on the received unique state information,
      determine whether a change of a first software binary applied to the electronic device is required based on a result of the verifying of the electronic device,
      generate change information identifying a second software binary to be changed, based on the change of the first software binary applied to the electronic device being required, and
      transmit the generated change information to the electronic device.

2. The system server of claim 1, wherein the instructions, when executed by the at least one processor, cause the system server to:
   communicate with the external server by using the communication module, and
   receive the device information and the production information by using the communication module.

3. The system server of claim 2, wherein the instructions, when executed by the at least one processor, cause the system server to identify at least one of whether the electronic device is a normally produced terminal, whether a model of the electronic device is a supported model, whether an ID of the electronic device is valid, and whether there is no error in input data based on the received device information and the received production information.

4. The system server of claim 1, wherein the instructions, when executed by at least one processor, cause the system server to map the device information according to specified criteria to generate a key table, and store the key table in the memory.

5. The system server of claim 1, wherein the validity module is configured to perform the second validity logic of verifying at least one of whether the electronic device is actually produced electronic device, whether an ID of the electronic device is a normal unique ID, and whether the electronic device is a normal electronic device, based on the unique state information.

6. The system server of claim 1, wherein the processor does not generate the information on the second binary based on the change of the first software binary not being required.

* * * * *